US006377686B1

(12) United States Patent
Snyder

(10) Patent No.: US 6,377,686 B1
(45) Date of Patent: Apr. 23, 2002

(54) CELLULAR PHONE WITH ADJUSTABLE STRAP ATTACHMENT

(75) Inventor: Matthew Snyder, Tokyo (JP)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/292,962

(22) Filed: Apr. 16, 1999

(30) Foreign Application Priority Data

Apr. 16, 1998 (GB) .............................................. 9808021

(51) Int. Cl.7 ................................................. H04M 1/00
(52) U.S. Cl. ....................................... 379/446; 379/454
(58) Field of Search ................................ 379/446, 454, 379/447, 455; 455/575, 90; 224/150, 913

(56) References Cited

U.S. PATENT DOCUMENTS

| | | | | |
|---|---|---|---|---|
| 2,533,493 A | * | 12/1950 | Mitchell ....................... | 455/90 |
| 3,495,700 A | * | 2/1970 | Seltmann, Jr. et al. ...... | 224/150 |
| 5,239,521 A | | 8/1993 | Blonder ........................ | 368/10 |

FOREIGN PATENT DOCUMENTS

| | | | | |
|---|---|---|---|---|
| EP | 0280997 | 2/1988 | ............ | H04M/1/02 |
| JP | 9298370 | 11/1997 | ............ | H05K/5/02 |

* cited by examiner

*Primary Examiner*—Jack Chiang
(74) *Attorney, Agent, or Firm*—Antonelli, Terry, Stout & Kraus, LLP

(57) ABSTRACT

A cellular phone that includes a housing, a strap attachment means, and a hinge means. The strap attachment means includes a bar positioned external to the housing and a first arm and a second arm at opposite ends of the bar. The hinge means allows the bar to be rotatable relative to the housing. The hinge means includes a first hinge and a second hinge coupled to the first arm and the second arm respectively. The spacing between the arms and the bar is extendible from a first length to a second length greater than that between the first and second hinges to permit removal of the strap attachment means. The arms are detachable from the housing when the spacing is extended to the second length. By providing a strap attachment means that provides a bar external to the cellular phone housing, the present invention offers many auxiliary support options.

10 Claims, 5 Drawing Sheets

CELLULAR PHONE WITH ADJUSTABLE STRAP ATTACHMENT

BACKGROUND OF THE INVENTION

The present invention relates to a radiotelephone.

Over recent years, the size of cellular telephones has decreased continuously to the stage where they may be said to be 'hand-held' or even 'palm-held'.

It is known to provide these cellular telephones with a cord for carrying the telephone. The cord is threaded through holes in the housing of the telephone and then its ends joined to form an endless loop. The user is able to conveniently carry the telephone by the cord when it is not in use. Also, when using the telephone, the user may pass his hand through the loop of the cord such that it encircles his wrist. Should the telephone then slip or be knocked from the user's hand, the cord provides an auxiliary means of support and prevents drop damage to the telephone.

The present invention is concerned with providing an auxiliary means of support for the radiotelephone and is, more specifically, concerned with the way in which the support is achieved.

SUMMARY OF THE INVENTION

To this end, the present invention provides a radiotelephone comprising a housing and strap attachment means, including a bar, positioned externally of the housing.

By providing a strap attachment means, and notably a strap attachment means which provides a bar external to the telephone housing, the present invention offers many auxiliary support options, as described hereinafter, which are not encountered in the prior art.

In one preferred embodiment, the telephone comprises a first strap attachment means positioned externally of one end of the housing and a second strap attachment means positioned externally of an opposite end of the housing, and a strap connected between the first and second strap attachment means. Using this embodiment, the user is able to hold the telephone in his palm in the normal way with his fingers passing between the strap and the back of the telephone. Then, should the user release or lose his hold of the telephone, the strap serves to retain the telephone in contact with the hand, thereby providing auxiliary support for the telephone.

Preferably, the strap attachment means comprises first and second arms at opposite ends of the bar, the arms being hingedly mounted to the housing. The strap attachment means and the housing may thus may define an elongate slot through which a strap may be fed and looped back around the bar in order to secure it to the attachment means.

In other aspects, the present invention may also relate to the transducer arrangements and covers as described hereinafter, and also the grips as described hereinafter.

BRIEF DESCRIPTION OF THE DRAWINGS

Exemplary embodiments of the invention are herein described with reference to the accompanying drawings, in which:

Referring to FIGS. 1 and 3, a cellular telephone, generally designated 10, is shown equipped with carrying strap —a so-called palm strap 100. The internal components of the telephone 10 are located within a housing 12 having a top end 12a, a bottom end 12b and sides 12c, 12d. In the top end 12a, a groove 13a is formed. In the bottom end 12b, a groove 13b is formed. Externally, the telephone 10 is provided with a keypad 14 and a display 16 as is conventional. Also, the telephone 10 is provided with grips 18 on the sides. The grips 18 are made from a non-slip, soft elastomer and are ribbed. The grips 18 are bonded to the housing 12 and provide some measure of side-impact protection. The telephone 10 is also provided with metal mesh speaker and microphone covers 20,22 respectively. In contrast with conventional cellular telephones 10, which use unobtrusive and relatively small holes to convey sound to and from the audio transducers (microphone 19, speaker 21 in FIG. 4), the mesh covers enable a relatively large opening to the exterior of the telephone to be used without making it more likely that foreign bodies will find their way inside the telephone and without any associated style penalty. Because relatively large openings to the audio transducers are possible, the position of the user to the telephone 10 when making a call is not so critical - this is particularly apparent with respect to the user's ear to speaker connection which benefits greatly from the greater speaker output catchment area.

Figure 1:
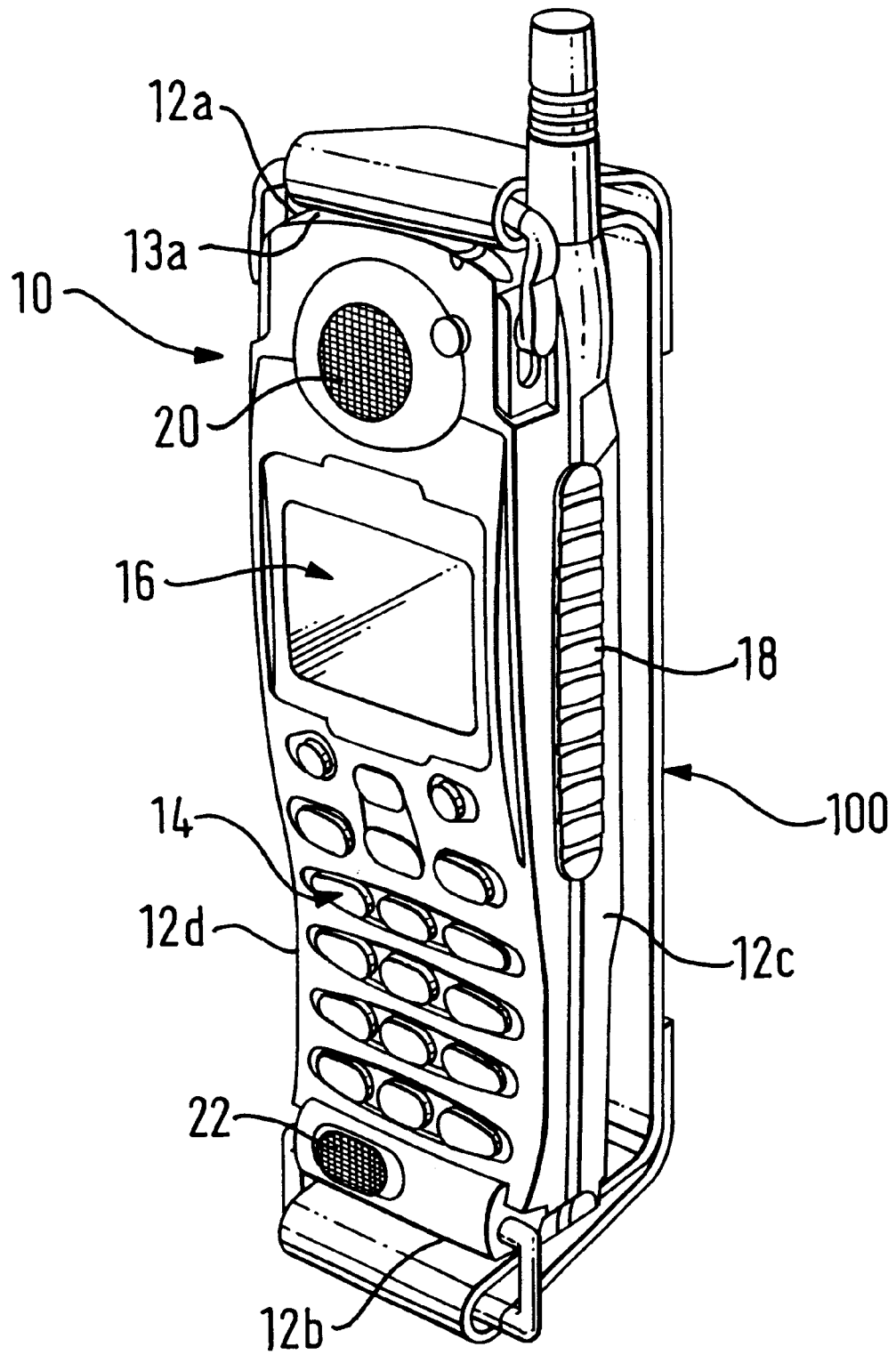
FIG. 1 shows a perspective view of a cellular telephone equipped with a palm strap in accordance with the present invention.
Figure 3:
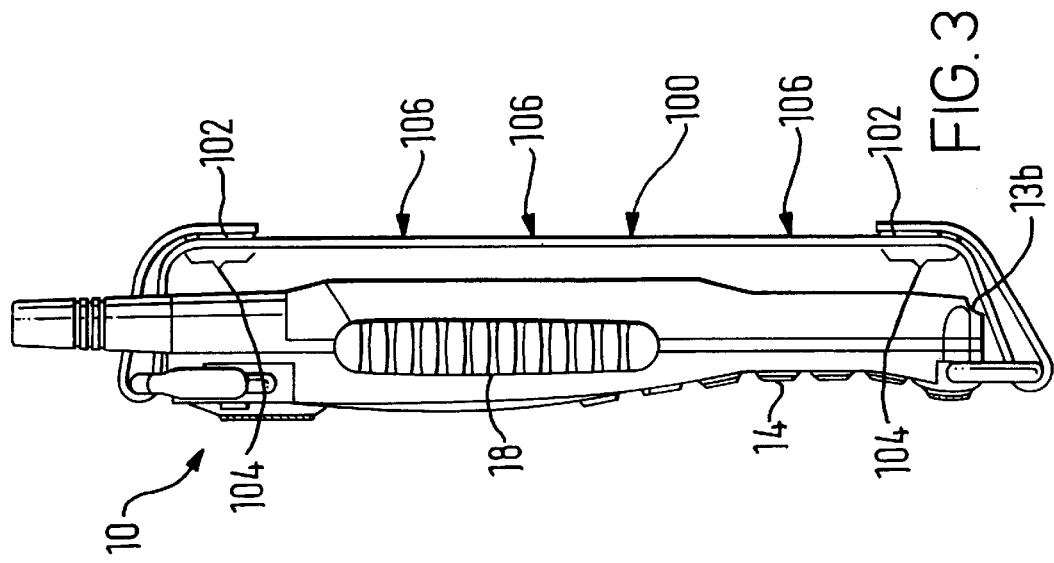
FIG. 3 shows a side view of FIG. 2.
Figure 2:
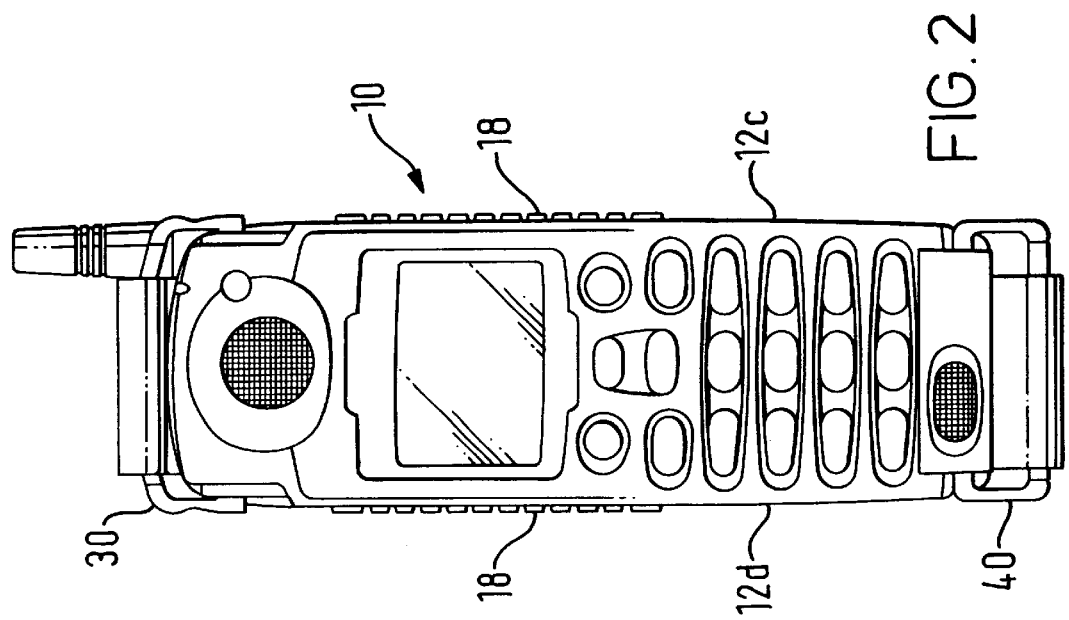
FIG. 2 shows a front view of FIG. 1.
Figure 4:
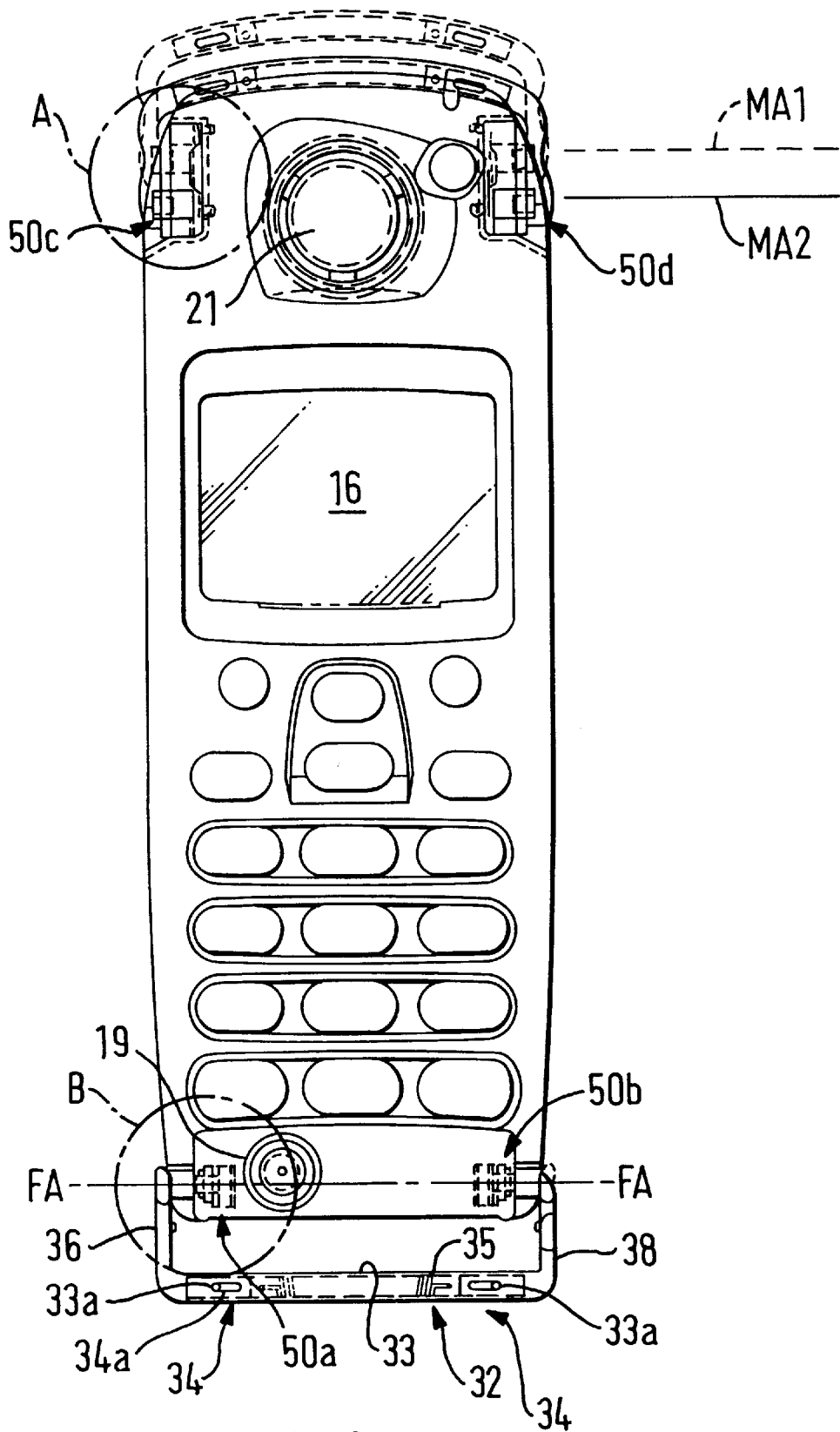
FIG. 4 shows the FIG. 2 view with some parts removed and some internal parts revealed.

The telephone 10 also comprises first and second attachment loops 30, 40 mounted to the housing 12 in the region of the top end 12a and in the region of the bottom end 12b, respectively. The attachment loops are best seen in FIG. 4 and are described in more detail later. Briefly, each attachment loop comprises a bar 32 from each end of which an arm 36,38 extends generally orthogonally therefrom to define a generally 'C'shape loop. Referring back to FIGS. 1 to 3, especially FIG. 3, the strap 100 is connected between the attachment loops 30, 40. The strap comprises a length of elastic material having first Velcro pads 102 situated at opposite extreme ends of the material. Positioned inwardly of the first Velcro pads 102 are second Velcro pads 104, which are larger than the first Velcro pads. Between the second Velcro pads, a region 106 of the material is reserved for bearing a design or logo, which might, for example, bear the name of the telephone manufacturer. The strap is attached by an end thereof to the first attachment loop 30 by threading it through the loop 30 and looping it back around the bar 32, such that the bar is encircled, and bringing neighbouring first and second Velcro pads 102,104 into engagement. It does not matter which pad 102,104 provides the hooks and which provides the loops. The other end of the strap is attached to the second attachment loop 34 in the same way.

Referring to FIG. 4, the attachment loops 30,40 are mounted to the housing 12 by hinge mechanisms.

Figure 6:
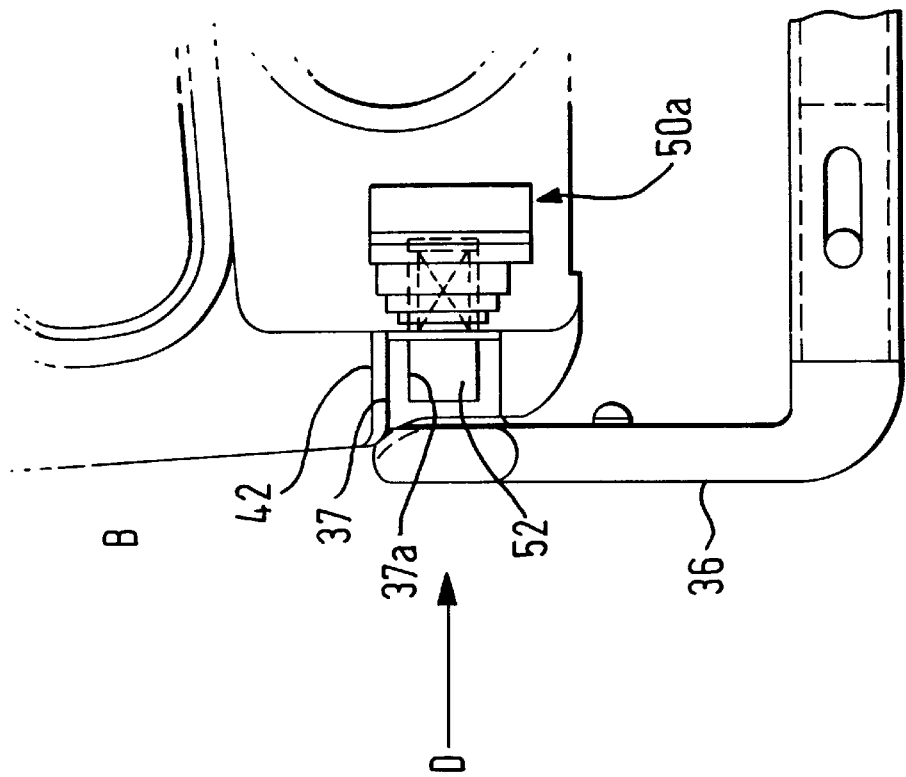
FIG. 6 shows the encircled portion B of FIG. 4 in enlarged form.

Referring first to the second attachment loop 40, this loop is attached to the housing 12 by a pair of hinge units 50a, 50b fixedly mounted within the housing, each hinge unit 50a, 50b being coupled to an arm of the second attachment loop 40. FIG. 6 shows the hinge unit 50a enclosed by circle B and its connection to arm 36 in close-up detail. (The situation at the other hinge unit 50b is identical.) The end of the arm 36 is provided with an inwardly-directed cup portion 37 which projects through an opening 42 in the housing 12. The cup portion 37 includes a recess 37a. The hinge unit 50a is fixedly mounted adjacent the opening 42 and includes a shaft 52 which mates with the recess 37a. Referring back to FIG. 4, the hinge units 50a, 50b together permit the second attachment loop to be rotated about a fixed axis labelled FA.

Figure 5:
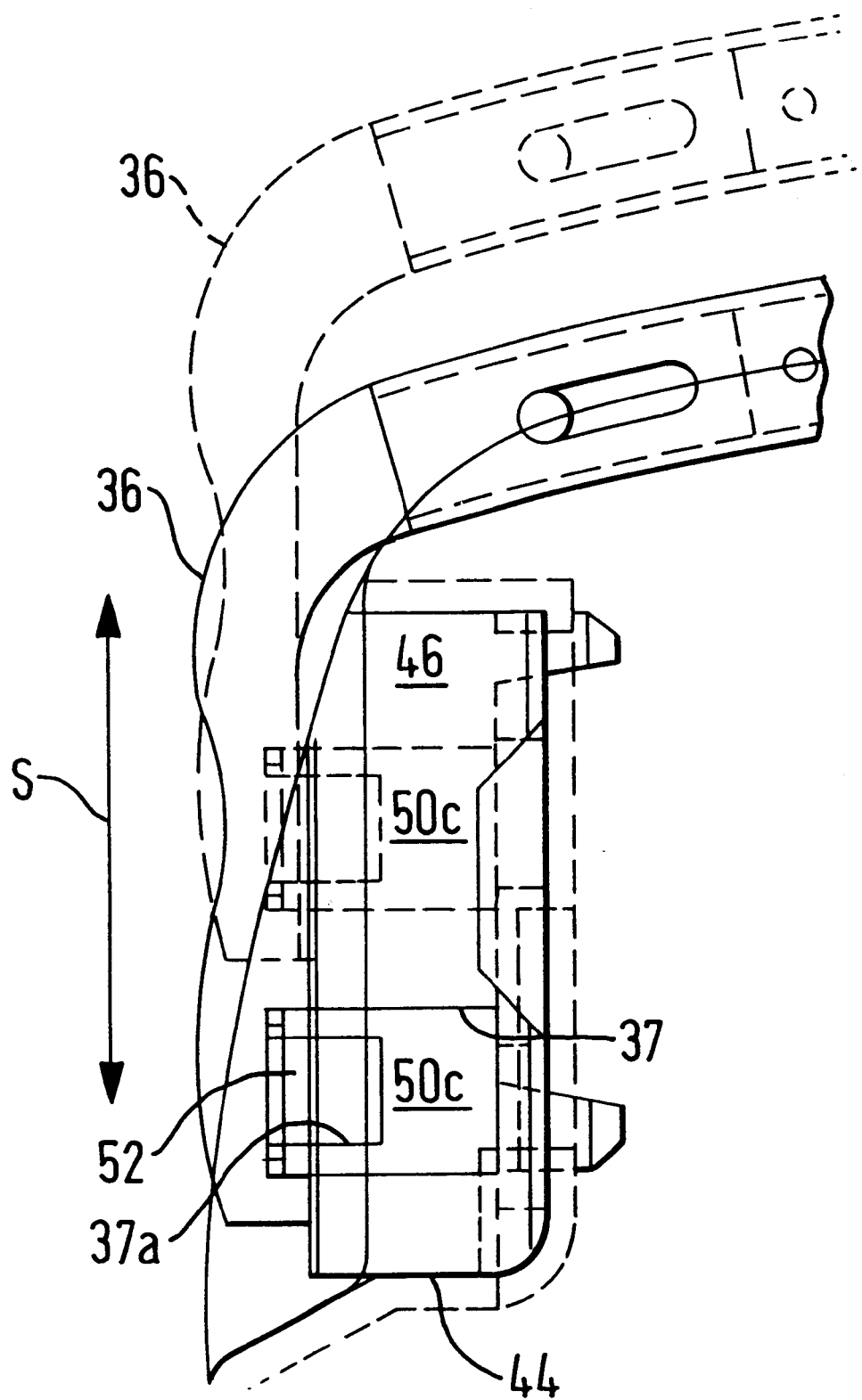
FIG. 5 shows the encircled portion A of FIG. 4 in enlarged form.

Referring now to the first attachment loop 30, this loop is attached to the housing 12 by a pair of hinge units 50c, 50d, each hinge unit 50c, 50d being coupled to an arm of the first attachment loop 40. FIG. 5 shows the hinge unit 50c enclosed by circle A and its connection to arm 36 in close-up detail. (The situation at the other hinge unit 50d is identical.) The end of the arm 36 is provided with an inwardly-directed cup portion 37 which projects through an opening 44 in the housing 12. The cup portion 37 includes a recess 37a. The hinge unit 50c includes a shaft 52 which mates with the recess 37a. However, instead of being fixedly mounted within the housing 12, as are the hinge units 50a, 50b, the hinge unit 50c is mounted within a hinge carrier 46. The hinge carrier 46 sits in the opening 44 and permits the hinge unit 50c to slide back and forth within the carrier 46, as indicated by the double-headed arrow S. There is a tight fit between the hinge carrier 46 and the hinge unit 50c, such that the hinge unit 50c can be moved to any one of a number of positions within the hinge carrier 46 by the user and will remain in that position in the absence of a force applied by the user. This is illustrated in FIGS. 4 and 6, where the two extreme positions which the hinge unit 50c (and hinge unit 50d) can adopt are illustrated simultaneously. In continuous lines, the hinge unit 50c is shown occupying its lowermost position within the hinge carrier 46, whereby the bar 32 (in continuous lines) rests in a retracted, idle position within the groove 13a. In dotted lines, the hinge unit 50c is showing in its uppermost position within the hinge carrier 46, whereby the bar 32 (in dotted lines) stands proud from the top end 12a of the housing in an operational position. Since the hinge units 50c, 50d may be slid in this way, they together define a hinge mechanism having a movable hinge axis. The two extreme possible hinge axes, corresponding to the two illustrated positions of the hinge units 50c, 50d, are labeled MA1 and MA2 in FIG. 4.

Figure 7:
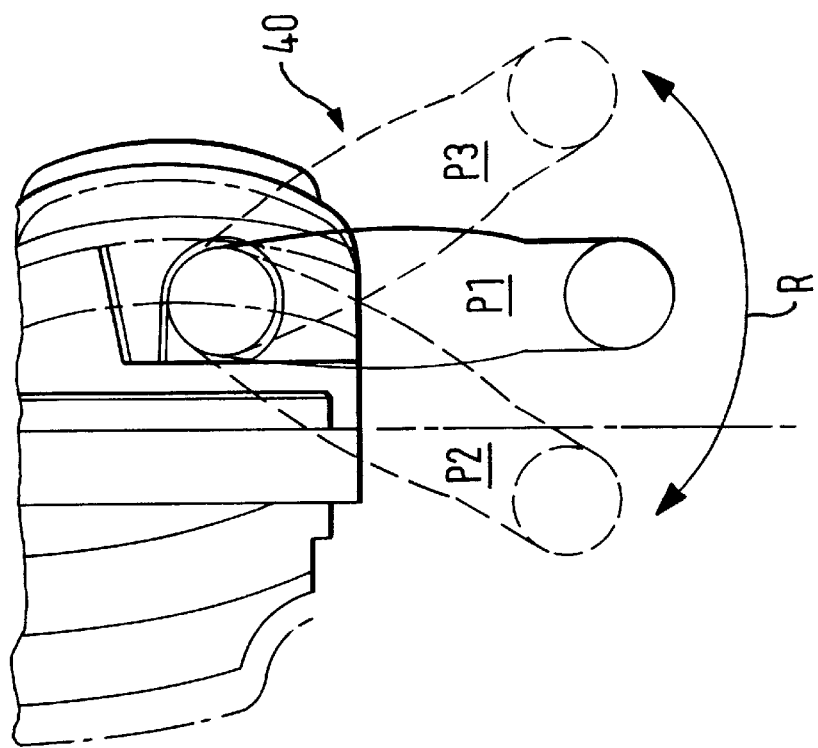
FIG. 7 shows a view indicated by arrow D in FIG. 6.

Each hinge unit 50a–d is identical and is internally constructed such that, at predetermined angular orientations, its shaft 42 occupies a favoured, rest position. Between these rest positions, the rotation of the shaft 42 is free-wheeling. This is illustrated in FIG. 7. The second attachment loop 40 is shown in three rest positions. Position P1, in continuous lines, and positions P2 and P3 in dotted lines. During rotation of the second attachment loop as indicated by the arrow R, if external forces applied by the user are removed when the attachment loop 40 is in any of positions P1, P2 or P3, it tends to remain at that position. On the other hand, if the attachment loop 40 is between rest positions P1, P2 or P3, it is free to converge under the weight of the attachment loop to one of the rest positions, where it remains. Although not shown, the second attachment loop has a rest position in which it sits in the groove 13b on the bottom side 12b of the housing 12 assuming an idle position.

Referring to FIG. 4, the bar 32 of each attachment loop 30, 40 is identical in construction. The length of the bar can be extended from its length in FIG. 4 to an greater length permitting the withdrawal of the shafts 52 from their respective cup portions 37 and hence removal of the attachment loops 30, 40. In more detail, the bar 32 comprises an outer tube 33 within which end portions 34 of the arms 36, 38 are slidably mounted. The end portions 34 include a short slot 34a within which a pin 33a formed on the outer tube 33 may travel. A spring 35 connecting the end portions 34 of the arms 36, 38 stiffly biases the attachment means into this position. By applying a relatively large outward pulling force to, say, the arm 38 of the second attachment means 40, the end portion 34 of the arm 38 can be drawn out telescopically from the tube 33, to an extent permitted by the engagement of the slot 34a and the pin 33a, thereby effectively increasing the length of the bar 32 withdrawing the shaft clear of the cup portion 37 enabling the attachment loop to be removed.

Referring back to FIG. 1, the user is able to hold the telephone 10 in his palm in the normal way with his fingers passing between the strap 100 and the back of the telephone. Thus, should the user release or lose his hold of the telephone, the strap 100 serves to retain the telephone in contact with the hand, thereby providing auxiliary support for the telephone.

Furthermore, the user can remove the strap 100 by, in turn, separating both pairs of Velcro pads 102, 104 and tugging the strap 100 free from the attachment loops 30, 40.

The user may then chose to fit another strap. The user may chose to fit another strap having the same functionality but, for example, a different colour or appearance, and/or a different design or logo in the region 106. Furthermore, the user may chose to fit a strap having a different functionality. For example, the mechanism by which the strap engages the attachment loops may be by a clip or hook. Also, the strap need not be attached to both attachment loops 30, 40.

If either (or even both) attachment loop 30, 40 is not required it can either be removed completely or withdrawn into its idle position (i.e. in the idle position, for the attachment loop 30, the bar 32 sits in the groove 13a and for the attachment loop 40, the bar 32 sits in the groove 13b) so as not to interfere with the user's normal use of the telephone. Even if the user does not take the trouble to move the attachment loops into their respective idle positions, they are not prone to rattling caused by rotational movement because of the favoured, rest positions of the hinge units 50a–d, as previously described. Furthermore, the first attachment loop is not prone to rattling because of the linear displacement of the hinge units 50c, 50d because of the tight frictional fit between the hinge units 50c, 50d and the hinge carrier 46.

In other embodiments, the hinge units may simply be spring biased to a single predetermined position to avoid rattling.

In view of the foregoing, it will be appreciated that the preferred embodiment of the present invention represents a considerable advancement over the state of the art.

What is claimed is:

1. A cellular phone comprising:

a housing;

a strap attachment means, the strap attachment means including a bar positioned externally of the housing and a first arm and a second arm at opposite ends of the bar; and a hinge means, the hinge means allowing the bar to be rotatable relative to the housing; the hinge means comprising a first hinge and a second hinge coupled to the first arm and the second arm respectively, wherein the spacing between the arms and the bar is extendible from a first length to a second length greater than that between the first and second hinges to permit removal of the strap attachment means, the arms being detachable from the housing when the spacing is extended to the second length.

2. The cellular phone as in claim 1, wherein the first and second hinges are fixedly mounted with respect to the housing, thereby providing a fixed hinge axis.

3. The cellular phone as in claim 1, wherein the first and second hinges are movable with respect to the housing, the hinge axis being movable between a first position and a second position.

4. The cellular phone as in claim 3, wherein, when the hinge axis adopts its first position, the bar sits in contact with the exterior of the housing.

5. The cellular phone as in claim 3, wherein, when the hinge axis adopts its second position, the bar stands apart from the exterior of the housing.

6. The cellular phone as in claim 1, wherein the hinge means is constructed such that at a number of predetermined angular positions relative to the housing, the arms enter a stable rest position.

7. The cellular phone as in claim 1, wherein the strap attachment means is removably mounted to the housing.

8. The cellular phone as in claim 1, wherein the bar is biased to adopt the first length.

9. A cellular phone comprising:

a housing;

a first strap attachment means positioned externally of one end of the housing and including a first bar;

a second strap attachment means positioned externally of an opposite end of the housing and including a second bar;

a strap connected between the first and second strap attachment means; and a hinge means, the hinge means allowing the first bar and the second bar to be rotatable relative to the housing; the hinge means comprising a first hinge and a second hinge coupled to the first bar and the second bar respectively wherein the hinge means is constructed such that at a number of predetermined angular positions relative to the housing, the bars enter a stable rest position.

10. The cellular phone as in claim 9, wherein the length of strap between the first and second attachment means is slightly longer than the distance between the first and second attachment means.

* * * * *